Figure 1:
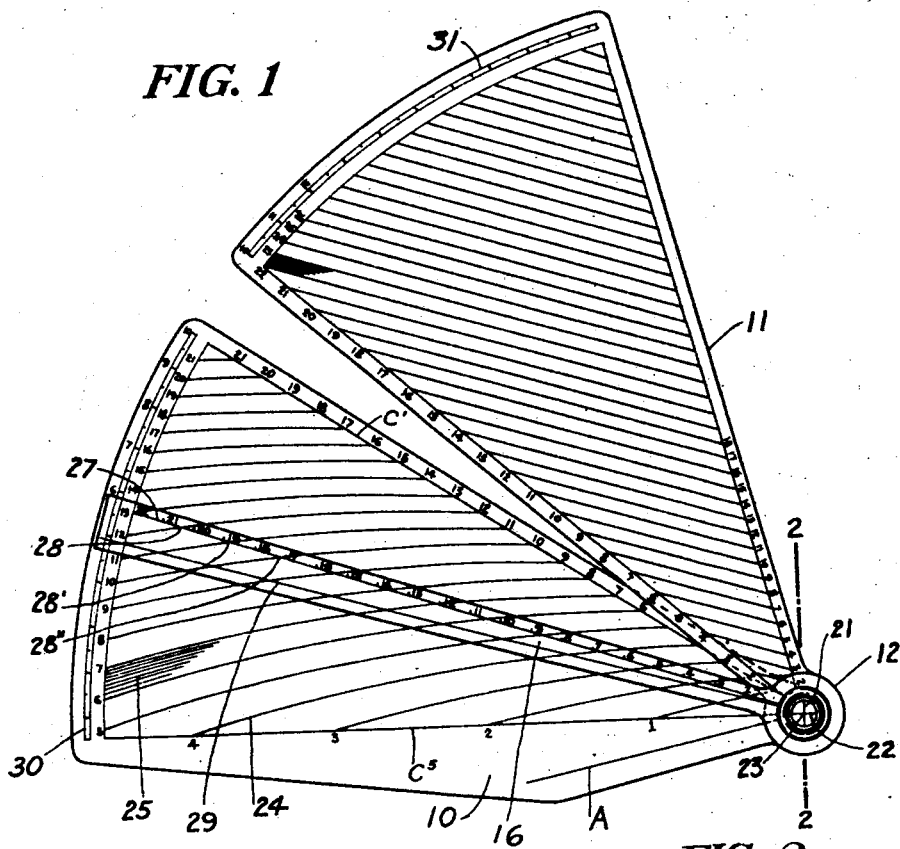

G. A. LOFLAND.
DIRECT READING PROPORTIONAL CALCULATING SCALE.
APPLICATION FILED DEC. 9, 1919.

1,404,450.

Patented Jan. 24, 1922.
2 SHEETS—SHEET 1.

INVENTOR.
George A. Lofland.
BY
H. H. Dyke
ATTORNEY.

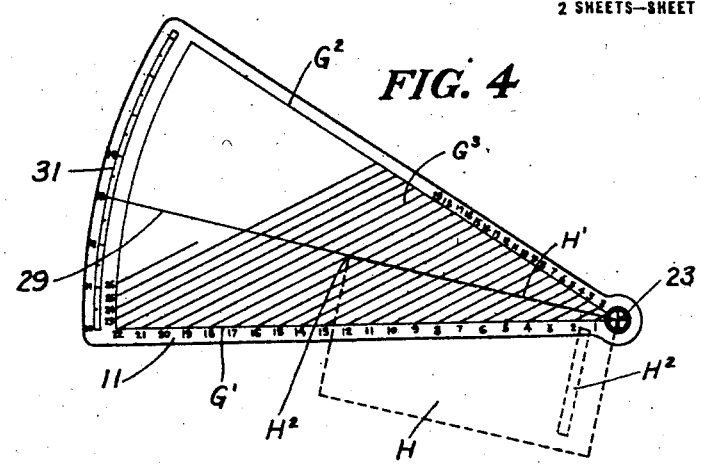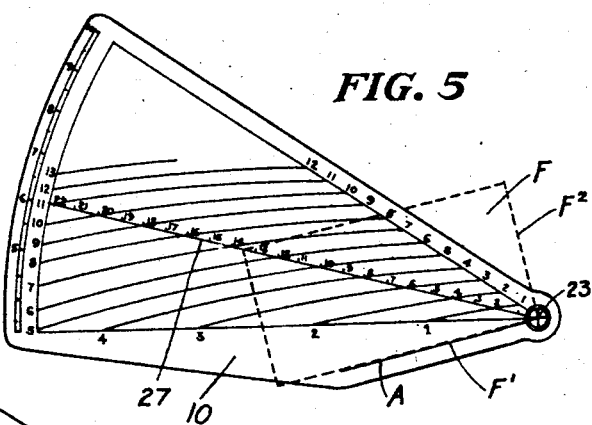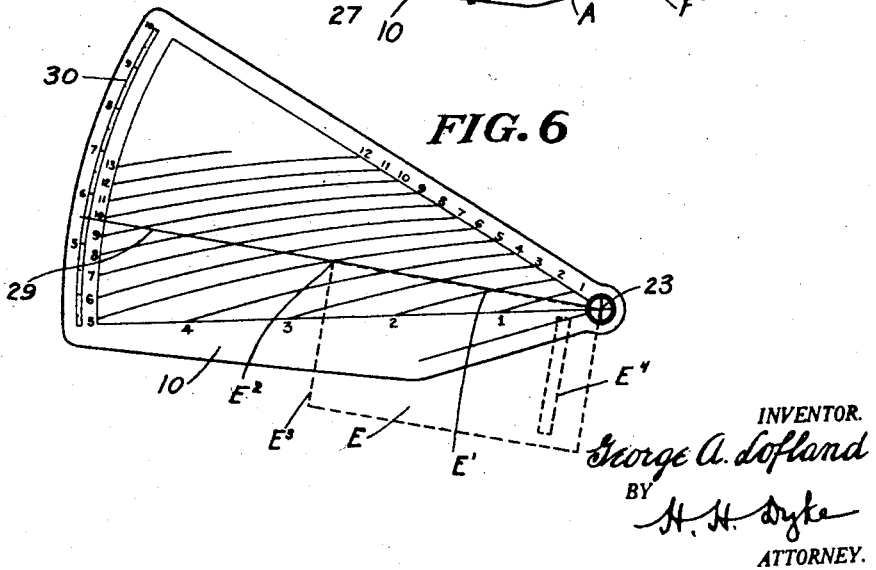

UNITED STATES PATENT OFFICE.

GEORGE A. LOFLAND, OF NEW YORK, N. Y.

DIRECT-READING PROPORTIONAL CALCULATING SCALE.

1,404,450. Specification of Letters Patent. Patented Jan. 24, 1922.

Application filed December 9, 1919. Serial No. 343,651.

*To all whom it may concern:*

Be it known that I, GEORGE A. LOFLAND, a citizen of the United States, and a resident of the borough of Manhattan, city, county, and State of New York, have invented certain new and useful Improvements in Direct-Reading Proportional Calculating Scales, of which the following is a specification.

My invention relates to a direct reading proportional calculating scale, for use in calculations involving ratios and proportion of such character that the desired results can be read direct from the scale by suitable manipulation of a radial arm, mounted to turn about the center provided therefor on the scale.

One of the uses for which a scale in accordance with my invention is adapted, is the immediate finding of the missing 4th term of a proportion of 4 terms, three of which are given, and the fourth of which is unknown and to be found. The scale is thus well adapted for solving problems arising in the work of printers and advertisers and others wherein drawings and the like are reduced or enlarged.

The dimensions of the original drawings are known and one of the dimensions of the enlargement or reduction is also known, as for example, the width of one, two or more columns, and with the use of my improved scale the other dimension can be immediately and simply determined.

Another object of the invention is the provision of means for indicating the setting for photographic reproduction instruments, as cameras, corresponding to a given reduction or enlargement of a drawing, picture or the like. The instrument is set to show the reduction of the drawing from one size to another, for example, and a scale is provided showing a reading which indicates the position of the copyholder relative to a camera for making a photographic reproduction of the drawing on the same scale.

The invention also provides simple means for dividing any given length into a given number of equal parts. It also may be used for making multiplications and for various other purposes.

With the foregoing and related objects in view my invention consists in the parts, elements, features of construction, and combinations herein set forth and claimed.

In the accompanying drawings I have shown an embodiment of my invention for the purpose of affording an understanding thereof, but it is to be understood that the same is for the purpose of affording an understanding of the invention only, and not for limitation of the invention.

Figure 2:
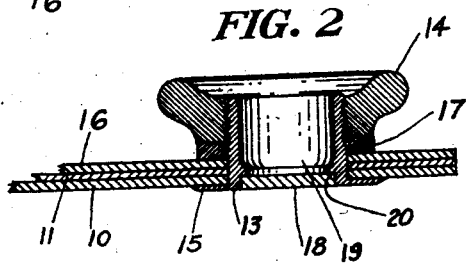
Figure 3:
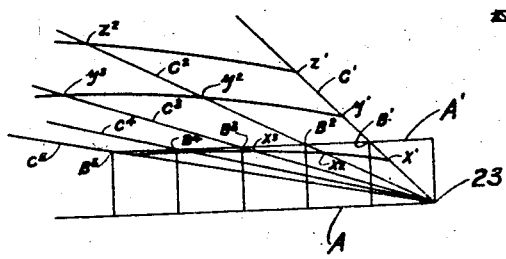

In said drawing, Fig. 1 is a plan view of one form of chart embodying my invention. Fig. 2 is a cross sectional detail view, taken on the line 2—2, Fig. 1. Fig. 3 is a diagram illustrating the plotting of the curved lines of the chart. Fig. 4 is a diagrammatical plan view showing one mode of using one of the parts of the chart shown in Fig. 1. Figs. 5 and 6 are plan views of the remaining parts of the chart shown in Fig. 1 and illustrating uses thereof.

The body of the chart is preferably made of transparent material, such as celluloid. In the form shown, same is divided into two parts 10 and 11, pivotally connected together at 12. The pivotal connection is obtained, in the form shown, by providing an apertured and threaded ring or thimble 13, on which is screwed the thumb nut 14. Thimble 13 has a flange 15, and the celluloid sheets 10 and 11, as well as the radial arm 16, are held between said flange 15 and nut 14, the washer 17 also being preferably interposed. With such arrangement the members 10 and 11 can be turned pivotally with respect to one another and also the arm 16 can be radially turned and said members can be clamped in any given relative positions by screwing up the nut 14.

A disk 18, also of transparent material, such as celluloid or the like, is received within the opening 19 of the thimble 13, and is preferably seated against a shoulder 20 and secured in place in any desired way, as by the use of glue or other cementitious material. The disk 18 is preferably provided with cross lines 21 and 22 which indicate at their intersection 23, the center of rotation of the various parts which have been referred to. With the arrangement described, it is possible to fold the parts together so as to take up relatively small space, which is a convenience in shipping and storing away, but, if desired, the sheets 10 and 11 may be made of a single sheet of material.

Chart member 10 is provided with curved lines 24 and intermediate curves 25. The lines 24 and 25 substantially cover the face of chart member 10, but to avoid confusion only a small portion of the intermediate curved lines 25 is shown in the drawings.

The mode of plotting the curves 24 and the subdivision curves 25 of the chart member 10 is illustrated in Fig. 3. The base line A of said Fig. 3 is the line A of chart member 10 of Fig. 1. Line A′ is drawn parallel to line A at any convenient distance away and on it are laid out a series of rectangles, the sides of which intersect the line A′ at equal intervals $B^1$, $B^2$, $B^3$, $B^4$ and $B^5$. In the form illustrated, the chart is limited to reduction to one-fifth size and consequently five of the rectangles are laid out, but additional rectangles and additional scope of reduction may be provided for, if desired.

Diagonals are drawn from the center point 23. For example, diagonal $C^1$ is drawn through the point $B^1$ and the next diagonal $C^2$ through point $B^2$ and so on. The diagonal $C^1$ is the line $C^1$ and the diagonal $C^5$ is the line $C^5$ of the scale member 10 of Fig. 1. As the first rectangle having the diagonal line $C^1$ is equal sided or square, the relation of the two sides being one to one, unit lengths, preferably inches, are laid off along diagonal line $C^1$ and the same are marked $x'$, $y'$, $z'$, etc.

In the next rectangle having diagonal $C^2$ the relation of the sides is 2–1 and therefore the diagonal line $C^2$ is divided into parts twice as long as those for lines $C^1$, say 2 inches, and same are marked $x^2$ $y^2$ $z^2$, etc. The same arrangement is carried out for the diagonal intersecting points $B^3$, $B^4$ and $B^5$, and the points are determined in the same way, those on the line $B^3$ being 3 units long, and marked $x^3$, $y^3$, $z^3$, and those on the diagonal passing through $B^4$ being 4 units long, and those through the diagonal $B^5$ being 5 units long.

Then the plotted points are connected up by making curves $x'$, $x^2$, $x^3$; $y'$, $y^2$, $y^3$, etc., and in this matter all the curved lines 24 and the subdivision lines 25 are constructed and form the basis for the scale and its uses. Lines 24 are numbered preferably as shown on the drawings, line $x'$, $x^2$, $x^3$ being marked 1, line $y'$, $y^2$, $y^3$ being marked 2, etc.

The radial arm 16 mounted to rotate about the center 23 is preferably of transparent material, such as celluloid, and is provided with subdivisions of the same length as the subdivisions along the line $C^1$. Such subdivisions are marked on a line 27 of scale 16 and it will be readily seen that when said arm 16 is turned to bring line 27 on line $C^1$, the numbers along line $C^1$, and along 27 will be identical and will coincide with one another. Other subdivision units may be chosen, if desired, but those illustrated serve conveniently to show an embodiment of the invention, convenient for use.

As the radial arm 16 is turned from the position just referred to, in which the line 27 thereof coincides with line $C^1$, it will be seen that the curved lines 24 of the chart member 10 serve to indicate equal subdivisions of said arm or any given part thereof. For example, in the position of arm 16 shown in Fig. 1, the division of 22 inches into 13 equal parts is illustrated by the intersection of said line 27 with various lines 24 as indicated at 28, 28′, 28″, etc.

Line 29 also provided on the radial arm 16 is preferably not subdivided, but left without mark and is used as a convenience for placing the drawing to be reduced at the proper place on the scale, as illustrated in Fig. 6.

An important use of the chart member 10 and the radial arm 16 is illustrated diagrammatically in Fig. 5. It is a common thing in advertising work to have to fit a drawing to the width of one, two or more columns of the publication in which it is inserted or the reduced cut must take a given length and the operation illustrated diagrammatically in this figure shows how this can be conveniently done, making use of the curved lines plotted thereon, as will now be explained. The drawing F is placed with the base line F′ thereof on the base line A, and one corner at the center point 23, and arm 16 is swung so that the line 27 thereof, that is to say, the line having the unit subdivisions, coincides with the diagonal of drawing F. With the parts in this relation, the desired dimension, which in the case supposed is the height of the cut to be made, can be immediately read, by taking the given length of the reduced cut on the line 27 and reading the ends marking on the line 24 intersected thereby. This is true because the lengths laid off on the line 27, arranged upon the diagonal of the figure F, bear the same ratio to the intersected lines 24 as the length F′ of the drawing F bears to its height $F^2$. For example, the drawing F shown is twice as long as it is wide. The subdivision 6 of line 27, as in Fig. 5, intersects the line marked 3, so that it is immediately known that if a reproduction of the drawing is made which is 6 inches in length, the same will have a width of 3 inches, and similarly if the reproduced drawing has a length of 12 inches, it will have a width of 6 inches and so on.

The chart described is also adapted to be used for the scale reduction of drawings, which is a very common operation to be performed for making up cuts for advertising matter, etc., in the following manner, as illustrated in detail in Fig. 6. E represents a drawing which is to be reduced so that its upper edge will be 5 inches long. It is placed under the scale member 10 with the upper right hand corner at the center point 23 and its upper side E′ turned into such position that the corner $E^2$ intersects with that one of the lines 24 marked 5 at the point $E^2$. The radial arm 16 is then turned and clamped with the line 29 thereof along the upper edge $E'$ of the figure or drawing E, and in such position line 29, being divided into five equal parts from 23 to $E^2$, provides a scale for measuring off any parts of the reduced drawing, which will thereby be reduced in the same proportion as the upper side of the figure. For example, if the end $E^3$ of the drawing be one-half the length $E'$, it will be found by now turning the drawing E around and bringing one end of the side to center 23, the opposite end of that side will be midway between such center and the point $E^2$ and the length thereof can be readily read off by means of the intersected curved line 24, and will in the case supposed come one-half way between the intersection of the lines 24 marked 2 and 3, with the scale line 29 so that the proper reading is 2.5. The same is true for any part of the drawing, E, as for example, the size of the name plate or other part of the drawing indicated at $E^4$, can be immediately read upon the scale so provided by line 29 by placing the part $E^4$ on such scale with one end at 23 and reading off the length thereof from the numbered curved lines of the chart which is intersected by the opposite end.

Multiplication may also be performed by placing the arm 16 with subdivided line 27 thereof in such position that one of the subdivisions thereof to be used as a multiplicand intersects the curved line numbered 1. Then to multiply by any number it is only necessary to note what number on the scale is intersected by that one of the curved lines 24 which bears the number of the multiplier. For instance in Fig. 5, 2 on line 27 intersects curved line 24 numbered 1. To multiply by 7, read back from numbered line 24 marked 7, to line 27 and it is seen to be intersected at 14, which gives the product directly. This is an important use particularly where fractional numbers are to be multiplied and a result to one point of decimals is sufficient for practical purposes.

Scale member 11 serves for enlargement of a drawing which may occasionally be necessary, but not so frequently as the reduction, and in the case of the scale member 11 two radial lines $G^1$ and $G^2$ are laid off at any angle with one another. In the form illustrated the angle between the radial lines $G^1$ and $G^2$ has been made for convenience the same as the angle between corresponding lines $C^5$ and $C^1$ in the chart member 10. These lines $G^1$ and $G^2$ are divided into parts having some definite relation to one another. In the form shown the line $G^1$ is subdivided into units of the same length as the units of line 27 on arm 16, and then corresponding subdivisions along line $G^2$ are one-half this unit, or half inches. These subdivisions are then connected up by lines $G^3$ which are used as a determining basis in enlargement work. To make use of this portion of the chart for enlarging a drawing a cut of figure H is placed with a corner on the center 23 and a side $H'$ thereof turned so that the corner $H^2$ intersects that one of the lines $G^3$, the number at the end of which indicates the dimension to which the side line is to be enlarged, for instance, in the showing of Fig. 4 it is desired to enlarge the drawing so that the longer side $H'$ will have a length of 18 inches. The radial arm 16 is placed with line 29 thereof along said side $H'$ of the figure H and thus a new proportional scale is provided for determining other parts of the figure. For example, if the name plate or other device $H^2$ appearing in the drawing H be now placed along the line 29 with one end thereof at the center 23 and the line intersected by the other end be read off, the length of such portion on the enlarged drawing will be directly given on such reading.

The arcuate scale 30 on the chart member 10 is provided for indicating the distance between the camera and the copyholder for making photographic reproductions of the drawing or figure to any desired size. For example, with the drawing E, Fig. 6, in place as shown, the intersection of the line 29 with the scale 30 gives a reading which represents the proper distance between the copyholder and the camera for making the desired reduction. The scale 31 on the chart member 11 is used in a similar manner for determining distances for photographic enlargements.

I claim:

1. In a chart of the class described, a base sheet having a series of numbered curved lines thereon, and a radial arm subdivided into units having such correspondence to the numbers and form of said curved lines that the ratio between the sides of rectangles having the radial arm for diagonal can be directly read by taking the radial distance and the number of the intersecting curve.

2. A chart for directly reading ratio between the sides of rectangles, which comprises a base sheet having a series of numbered curved lines thereon and an arm pivoted for radial movement, the subdivisions on said arm and the numbering and form of said curved lines being so related that the ratio between the sides of rectangles having the arm for a diagonal may be directly read by taking the distance out on the radial arm and the number of the intersecting curve.

3. In a chart of the class described, a base sheet, a base line thereon, and a base point on the line, a series of numbered curved lines on the sheet and so formed and related to one another and to the base point that any radial distance out from said basepoint on a line passing through the point to an intersected curve bears the same ratio to the number of the curve intersected as the longer side of any rectangle having the base line for its base and the base point at one end and having such line for its diagonal bears to the other side of said rectangle.

4. In a chart of the class described, a base sheet, a base line and a base point on the said line, and a series of curved lines permanently marked on the said sheet, said curved lines being plotted by connecting points on the diagonal of rectangles standing on the base line and beginning at the base point and having the longer sides thereof increasing successively by the same units as the sides of the rectangles, the points on said diagonals being separated by successively increasing multiples of an arbitrary unit, and a longitudinally subdivided scale pivoted to the chart at the base point, whereby when a rectangle is placed with its base on the base line and with the pivoted scale on its diagonal, the base and altitude of similar rectangles can be read off directly on the scale and the corresponding curves respectively.

5. The combination with a sheet of substantially transparent material of a member of similar material pivoted thereto and having a line thereon subdivided to form a scale, a base line on said sheet passing through the pivoting point, and a series of numbered curves on said sheet said curves being so numbered, and formed and related to the pivot point and one another that when a rectangle is placed with its base on the base line and with the pivoted scale on its diagonal, the base and altitude of similar rectangles can be read off directly on the scale and the corresponding curves respectively.

In testimony that I claim the foregoing, I have hereto set my hand, this 8th day of December, 1919.

GEORGE A. LOFLAND.